United States Patent
Johansson et al.

(10) Patent No.: US 12,519,953 B2
(45) Date of Patent: Jan. 6, 2026

(54) METHOD AND DEVICE FOR HANDLING BANDWIDTH SHORTAGE IN RELATION TO TRANSMISSION OF VIDEO FRAMES

(71) Applicant: Axis AB, Lund (SE)

(72) Inventors: Malte Johansson, Lund (SE); Axel Jonsson, Lund (SE); Mattias Pettersson, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 18/899,847

(22) Filed: Sep. 27, 2024

(65) Prior Publication Data

US 2025/0113046 A1    Apr. 3, 2025

(30) Foreign Application Priority Data

Oct. 2, 2023 (EP) .................................... 23201253

(51) Int. Cl.
    *H04N 19/164*      (2014.01)
    *H04N 19/176*      (2014.01)
    *H04N 19/503*      (2014.01)

(52) U.S. Cl.
    CPC ......... *H04N 19/164* (2014.11); *H04N 19/176* (2014.11); *H04N 19/503* (2014.11)

(58) Field of Classification Search
None
See application file for complete search history.

(56) References Cited

U.S. PATENT DOCUMENTS

| | | | | |
|---|---|---|---|---|
| 6,765,963 | B2 * | 7/2004 | Karczewicz | H04N 19/58 375/240.03 |
| 8,040,949 | B2 * | 10/2011 | Cosman | H04N 19/147 375/240.12 |

(Continued)

FOREIGN PATENT DOCUMENTS

| EP | 1936996 A2 | 6/2008 |
|---|---|---|
| EP | 2360669 A1 | 8/2011 |

(Continued)

OTHER PUBLICATIONS

Extended European Search Report issued on Feb. 28, 2024 for European Patent Application No. 23201253.4.

(Continued)

*Primary Examiner* — Chikaodili E Anyikire
(74) *Attorney, Agent, or Firm* — Volpe Koenig

(57) ABSTRACT

A system for handling bandwidth shortage for transmission of encoded video frames. In a sending device, a long term reference frame which indicates bandwidth shortage is created. During a first time period, the reference frame is sent to the receiving device for storage. During a subsequent second time period, bandwidth shortage is determined in the sending device, wherein the bandwidth during the second time period is insufficient if the encoded video frames are encoded according to an encoding principle used at times without bandwidth shortage. During the second time period, inter encoded frames referencing the long term reference frame are sent, wherein each frame includes encoded blocks, and at least a subset of the blocks of the inter encoded frames are empty blocks such that the bit rate of the inter encoded frames is lower or equal to the bandwidth during the second time period.

12 Claims, 3 Drawing Sheets

(56) References Cited

U.S. PATENT DOCUMENTS

| | | | |
|---|---|---|---|
| 9,584,832 B2* | 2/2017 | Corey | H04N 19/132 |
| 2010/0325409 A1 | 12/2010 | Kim et al. | |
| 2019/0116371 A1 | 4/2019 | Edpalm et al. | |
| 2019/0306525 A1* | 10/2019 | Edpalm | H04N 19/137 |
| 2020/0404330 A1 | 12/2020 | Liu et al. | |
| 2021/0092412 A1 | 3/2021 | Edpalm | |
| 2021/0211742 A1 | 7/2021 | Wang et al. | |
| 2022/0116589 A1 | 4/2022 | Pihl et al. | |
| 2022/0210469 A1* | 6/2022 | Zhou | H04N 19/172 |
| 2022/0368534 A1 | 11/2022 | Lundberg et al. | |

FOREIGN PATENT DOCUMENTS

| | | |
|---|---|---|
| WO | 2008/070987 A1 | 6/2008 |
| WO | 2019/092392 A1 | 5/2019 |

OTHER PUBLICATIONS

Communication Pursuant to 94(3) EPC issued on Jun. 26, 2024 for European Patent Application No. 23201253.4.

* cited by examiner

METHOD AND DEVICE FOR HANDLING BANDWIDTH SHORTAGE IN RELATION TO TRANSMISSION OF VIDEO FRAMES

FIELD OF INVENTION

The present disclosure relates to transmission of encoded video, and specifically to handling a bandwidth shortage in in relation to transmission of encoded video frames of a video sequence from a sending device to a receiving device.

TECHNICAL BACKGROUND

In applications where encoded video frames of a video sequence are to be sent from a sending device to a receiving device, the bandwidth from the sending device to a receiving device may vary over time such that there during periods of time may be a bandwidth shortage from the sending device to the receiving device. During bandwidth shortage, the bandwidth is insufficient for sending encoded video frames from the sending device to the receiving device without considerable delay and/or loss of frames. This may in turn cause problems in some applications and/or systems. For example, if the encoded frames are frames of a video captured by a surveillance camera and encoded at a sending device and then sent to a receiving device at a remote site where an operator should view the decoded video, the operator may not realize that there is a delay and/or loss of frames, a decoder at the receiving device may not be able to successfully decode the encoded video frames, or a management system at the receiving device may time out if encoded frames are not received in a certain interval. An example where the bandwidth may vary over time such that there during periods of time may be a bandwidth shortage is when encoded video frames of a video sequence are to be sent at least partly via wireless communication, e.g., using LTE, 5G etc. This may for example occur when the video is captured by a body worn camera (BWC) and should be encoded and sent to a receiving device located at a remote site for decoding and viewing by an operator.

EP1936996A2 discloses a method for saving bandwidth when synching up after a frame has been lost during transmission by using the latest successfully received frame as a long term reference frame instead of sending a new I frame.

SUMMARY

An object of the present disclosure is to overcome or at least mitigate the problems and drawbacks of prior art.

According to a first aspect, a method is provided for handling a bandwidth shortage in relation to transmission of encoded video frames of a video sequence captured by a camera from a sending device to a receiving device. The method comprises creating, in the sending device, a long term reference frame, wherein the long term reference frame contains pixel information unrelated to image pixel data captured by the camera to indicate a bandwidth shortage. During a first time period, the long term reference frame is sent from the sending device to the receiving device for storing at the receiving device. During a second time period different from and subsequent to the first time period, a bandwidth shortage from the sending device to the receiving device is detected in the sending device. The bandwidth during the second time period is insufficient for sending encoded video frames of the video sequence from the sending device to the receiving device if the encoded video frames are encoded according to an encoding principle used at times without bandwidth shortage. During the second time period, inter encoded frames referencing the long term reference frame are sent to the receiving device. Each inter encoded frame includes encoded blocks, and at least a subset of the encoded blocks of the inter encoded frames are set as empty blocks such that the bit rate of the inter encoded frames is lower or equal to the bandwidth during the second time period.

By 'a long term reference frame' is meant herein a frame that is intended to be stored on long term in the receiving device for reference, for example until explicit deletion is requested and preferably throughout a complete session for transmission of encoded video frames of a video sequence from a sending device to a receiving device.

By 'the long term reference frame indicates bandwidth shortage" is meant that it can be derived from the long term reference frame that there is a bandwidth shortage. For example, an operator viewing one a video frame, such as one of the inter encoded frames, which is based on the long term reference frame can derive from that video frame that there is a bandwidth shortage.

By 'an encoding principle used at times without bandwidth shortage' is meant herein the encoding principle that is used to encode video frames when there is sufficient bandwidth between the sending device and the receiving device. This is typically an encoding principle that makes use of all of the pixel information from video frames captured by a camera at the sending device. The encoding principle will produce encoded video frames that have a bit rate lower than a typical bandwidth between the sending device and the receiving device when there is no bandwidth shortage given a frame rate of the video sequence.

By 'a bandwidth shortage in relation to transmission of encoded video frames of a video sequence from a sending device to a receiving device' is meant herein that the bandwidth is such that encoded frames which have been encoded according to the encoding principle used at times without bandwidth shortage cannot be transmitted or are delayed. The reason for bandwidth shortage is typically due to a reduction of available bandwidth but may also be due to an increase in the size of encoded frames which have been encoded according to the encoding principle used at times without bandwidth shortage or a combination of both.

By 'empty block' is meant herein a block including no update, i.e., coding a zero residual, but may include a motion vector in relation to a block in a reference frame. An empty block will typically include fewer bits than a corresponding encoded block of a frame encoded according to the encoding principle used at times without bandwidth shortage.

The 'bit rate of the inter encoded frames' is determined as the number of bits of the inter encoded frames divided by the frame rate of the inter encoded frames.

By creating, in the sending device, a long term reference frame, wherein the long term reference frame contains pixel information unrelated to image pixel data captured by the camera to indicate a bandwidth shortage, sending the long term reference frame to the receiving device for storing, and then sending inter encoded frames referencing the long term reference frame to the receiving device, it can be derived from the inter encoded frames when decoded and displayed at the receiving device that there is a bandwidth shortage. Furthermore, by setting at least a subset of the encoded blocks of the inter encoded frames as empty blocks such that the bit rate of the inter encoded frames is lower than or equal to the bandwidth during the second time period, the inter encoded frames are possible to transmit during the second time period in spite of the bandwidth shortage. The bit rate of the inter encoded frames will then be lower than the bit rate would have been using the encoding principle at times without bandwidth shortage. Enabling transmission of encoded blocks in the form of the inter encoded blocks during the second time period will result in the receiving device receiving encoded blocks also during the second time period. This is beneficial since it enables receipt of the inter encoded frames referencing the long term reference frame indicating bandwidth shortage such that it can be derived from the inter encoded frames when decoded and displayed at the receiving device that there is a bandwidth shortage. Furthermore, this is also beneficial in scenarios where there is a requirement for receipt of encoded blocks regularly at the receiving device in order for the receiving device or a function at the receiving device not to time out, malfunction or other. If the receiving device or a function, such as a management function, at the receiving device times out this may typically lead to delays due to the need for restarting the receiving device or the function at the receiving device leading to loss of image data. Furthermore, if only inter encoded frames including empty blocks and referring to a latest successfully received frame encoded according to the encoding principle used at times without bandwidth shortage, an operator may not be able to determine that there is a bandwidth shortage. Hence, having the inter encoded frames referencing the long term reference frame indicating bandwidth shortage is beneficial since it enables the operator to be able to determine that there is a bandwidth shortage.

In embodiments all of the encoded blocks of the inter encoded frames are empty blocks. In alternative all of the encoded blocks of the inter encoded frames may be skip blocks such that all of the inter encoded frames referencing the long term reference frame are skip frames. By this the bit rate for the inter encoded frame will be further reduced, enabling transmission during even lower bandwidth between the sending device and the receiving device.

By 'skip block' is meant herein a block includes no update, i.e., coding a zero residual, and no motion vector in relation to a block in a reference frame. An skip block will typically include fewer bits than a corresponding encoded block of a frame encoded according to the encoding principle used at times without bandwidth shortage.

The method provided according to the first aspect, may further comprise selecting the first time period such that the bandwidth from the sending device to the receiving device during the first time period is sufficient for sending the long term reference frame.

In embodiments, the long term reference frame contains pixel information unrelated to image pixel data from the scene.

The long term reference frame may be a solid colour frame.

The long term reference frame may comprise one or more of text information, a symbol, and an image indicating bandwidth shortage.

The inter encoded frames may be created and stored at the sending device during a third time period different from and preceding the second time period. This is advantageous in order to avoid the need for processing at the time of a bandwidth shortage.

The method provided according to first aspect may further comprise storing the long term reference frame at the receiving device. For example, the long term reference frame may be stored in a reference buffer at the receiving device. The long term reference frame may further be indicated to be maintained in the reference buffer.

According to a second aspect, a non-transitory computer readable storage medium is provided having stored thereon instructions for implementing the method according to any one of claims 1 to 8, when executed in a system having a sending device, a receiving device, a memory, and processing capabilities.

According to a third aspect, a sending device is provided for handling a bandwidth shortage in in relation to transmission of video frames of a video sequence captured by a camera to a receiving device. The device comprises a circuitry configured to execute a creating function, a first sending function, a detecting function, and a second sending function. The creating function is configured to create a long term reference frame, wherein the long term reference frame contains pixel information unrelated to image pixel data captured by the camera to indicate a bandwidth shortage. The first sending function is configured to send, during a first time period, the long term reference frame to the receiving device for storing at a receiving device. The detecting function is configured to detect, during a second time period different from and subsequent to the first time period, a bandwidth shortage to the receiving device, wherein the bandwidth during the second time period is insufficient for sending video frames of the video sequence to the receiving device if the encoded video frames are encoded according to an encoding principle used at times without bandwidth shortage. The second sending function is configured to send, to the receiving device during the second time period, inter encoded frames referencing the long term reference frame, wherein each inter encoded frame includes encoded blocks, and wherein at least a subset of the encoded blocks of the inter encoded frames are empty blocks such that the bit rate of the inter encoded frames is lower or equal to the bandwidth during the second time period.

In embodiments all of the encoded blocks of the inter encoded frames are empty blocks. In alternative all of the encoded blocks of the inter encoded frames may be skip blocks such that all of the inter encoded frames referencing the long term reference frame are skip frames.

The circuitry may be further configured to execute a selecting function. The selecting function is configured to select the first time period such that the bandwidth from the sending device to the receiving device during the first time period is sufficient for sending the long term reference frame.

In embodiments, the long term reference frame contains pixel information unrelated to image pixel data from the scene.

The long term reference frame may be an solid colour frame.

The long term reference frame may comprise text information indicating bandwidth shortage.

The creating function may be further configured to create and store the inter encoded frames at the sending device during a third time period different from and preceding the second time period.

The method provided according to first aspect may further comprise storing the long term reference frame at the receiving device. For example, the long term reference frame may be stored in a reference buffer at the receiving device. The long term reference frame may further be indicated to be maintained in the reference buffer.

The long term reference frame may further be indicated to be maintained in the reference buffer.

The above-mentioned optional additional features of the method according to the first aspect, when applicable, apply to the device according to the fourth aspect as well. In order to avoid undue repetition, reference is made to the above.

According to a fourth aspect, a receiving device is provided for handling a bandwidth shortage in relation to transmission of video frames of a video sequence captured by a camera from a sending device. The receiving device comprises a circuitry configured to execute a first receiving function, a storing function, and a second receiving function. The first receiving function is configured to receive, during a first time period, a long term reference frame from a sending device, wherein the long term reference frame contains pixel information unrelated to image pixel data captured by the camera to indicate a bandwidth shortage. The storing function is configured to store the long term reference frame. The second receiving function is configured to receive, from the sending device during a second time period different from and subsequent to the first time period, inter encoded frames referencing the long term reference frame, wherein each inter encoded frame includes encoded blocks, and wherein at least a subset of the encoded blocks of the inter encoded frames are empty blocks such that the bit rate of the inter encoded frames is lower or equal to the bandwidth during the second time period.

The receiving device of the fourth aspect may include a buffer memory for storing the long term reference frame.

According to a fifth aspect, a system for handling a bandwidth shortage in relation to transmission of video frames of a video sequence, wherein the system comprises the sending device according to the first aspect and a receiving device according to the fourth aspect.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that this disclosure is not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF DRAWINGS

The above and other aspects of the present disclosure will now be described in more detail, with reference to appended figures. The figures should not be considered limiting but are instead used for explaining and understanding.

DETAILED DESCRIPTION

The present disclosure will now be described hereinafter with reference to the accompanying drawings, in which currently preferred embodiments of the disclosure are illustrated. This disclosure may, however, be embodied in many different forms and should not be construed as limited to the embodiments set forth herein.

Generally, when video captured by a surveillance camera is to be sent to a remote receiving device for display to an operator, the video frames of the video from the camera are each encoded using an encoding principle before being sent to the receiving device and then decoded at the receiving device before displaying to the operator. Such an encoding principle may vary depending on the application but typically the encoding enables reduction of the bitrate of the encoded video in relation to the video before encoding due to the possibility to reuse of pixel information within each video frame and between video frames. Additionally, such encoding principles may be adaptive to interest levels of different portions of the video frames or different objects identified in the video frames, such that a higher quality is provided in some portions or to some objects than to other, e.g. to enable reduced bit rate by reducing the quality of portions or objects of lower interest.

The disclosure is applicable to scenarios where encoded video frames of a video sequence are to be sent from a sending device to a receiving device and where bandwidth from the sending device to a receiving device may vary over time and specifically where there during periods of time is a bandwidth shortage from the sending device to the receiving device such that the bandwidth is insufficient for sending encoded video frames of a video sequence from the sending device to the receiving device if the encoded video frames are encoded according to an encoding principle used at times without bandwidth shortage. Such scenarios may for example be where video frames of a video sequence captured in a camera, such as a body worn camera (BWC), are to be encoded and sent at least partly via wireless communication, e.g. using LTE, 5G etc., from the body worn camera to a receiving device located at a remote site for viewing by an operator.

Figure 1:
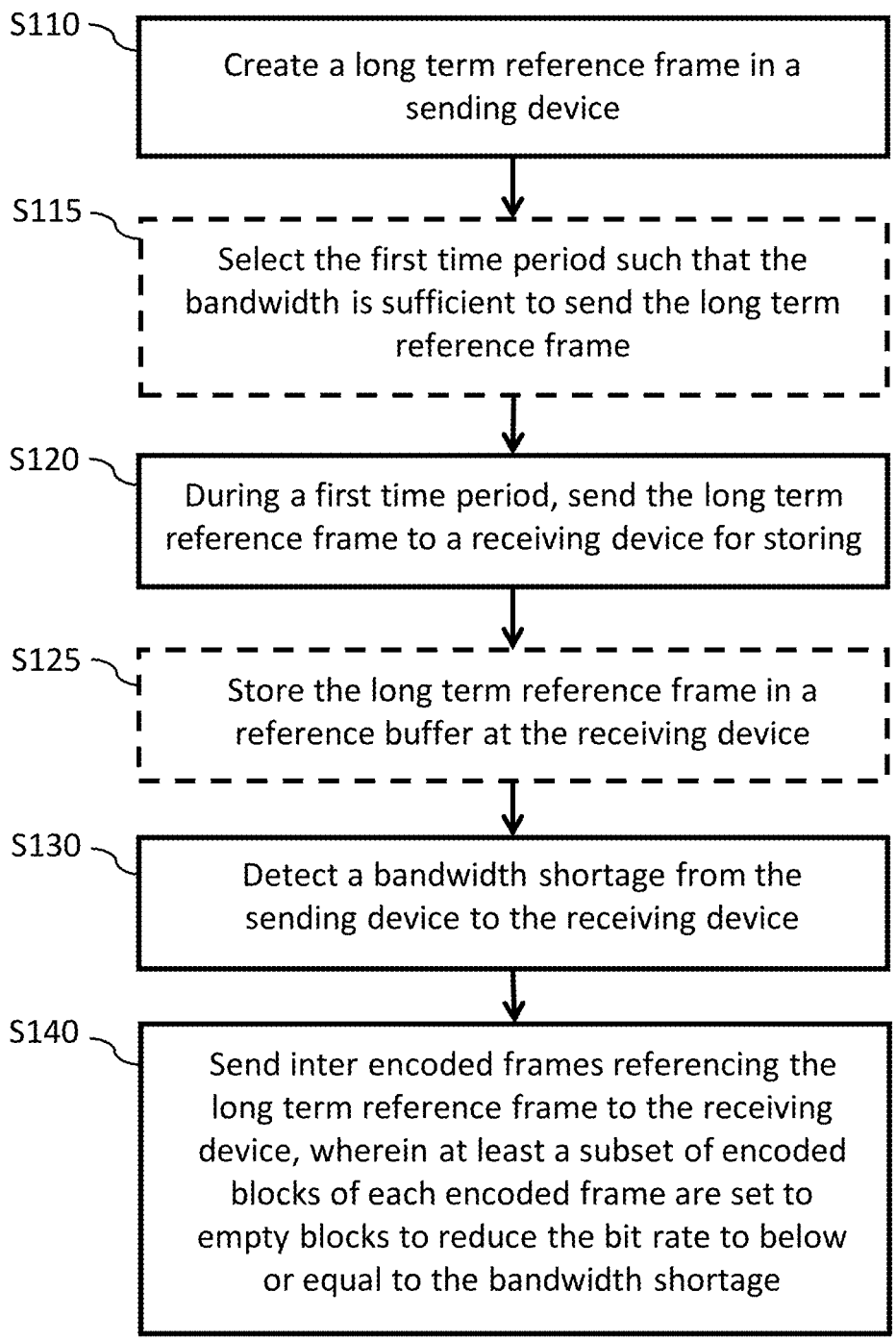
FIG. 1 shows a flow chart in relation to embodiments of a method for handling a bandwidth shortage in in relation to transmission of encoded video frames of a video sequence from a sending device to a receiving device.

Embodiments of a method 100 for handling a bandwidth shortage in relation to transmission of encoded video frames of a video sequence from a sending device to a receiving device will now be described in relation to the flow chart in FIG. 1. The video frames of the video sequence may be captured by a camera connected to or arranged in the sending device.

The method 100 comprises creating S110 a long term reference frame in the sending device. The long term reference frame is created such that it indicates bandwidth shortage. By this is meant that when the long term reference frame is decoded and displayed at the receiving device, an operator viewing the long term reference frame can determine that there is a bandwidth shortage. The long term reference frame is intended to be used as a reference frame at times when there is a bandwidth shortage and is intended to indicate that there is a bandwidth shortage. It is not necessary for the long term reference frame to convey any information from video frames captured by a camera in or connected to the sending device during the bandwidth shortage. Hence, the long term reference frame may be created without the use of any information from any video frames captured by a camera in or connected to the sending device.

The long term reference frame is preferably created and stored at the sending device before the encoded video frames are sent from the sending device to the receiving device.

The method 100 further comprises sending S120 the long term reference frame from the sending device to the receiving device for storing at the receiving device. The long term reference frame is sent during a first time period. The first time period may be selected S115 such that the bandwidth from the sending device to the receiving device during the first time period is sufficient for sending the long term reference frame. The first time period is preferably selected to be before the encoded video frames are sent from the sending device to the receiving device. This may be achieved by ensuring that there is a first time period before encoded video frames are sent from the sending device to the receiving device when the bandwidth is sufficient. For example, if the sending device is a body worn camera, the first time period may be selected S115 to be when the body worn camera is positioned at a location where the bandwidth from the sending device to the receiving device is sufficient for sending the long term reference frame.

The method 100 may further comprise storing S125 the long term reference frame at the receiving device, e.g. in a reference buffer. The long term reference frame may further be indicated to be maintained in the receiving device. For example, the long term reference frame may include information indicating that it is to be maintained in the receiving device. The reference frame should be stored in the receiving device, e.g. in the reference buffer, and is preferably maintained as long as encoded video frames of a video sequence from the sending device to the receiving device which would for example require that it is not get cleared from the reference buffer at the receiving device when starting a new group of pictures, i.e., at decoding of a new intra frame. The method further preferably includes refraining to send any instantaneous decoder refresh (IDR) frames which would remove all reference frames including the long term reference frame from the receiving device, e.g., by flushing the reference buffer at the receiving device.

The method 100 further comprises detecting S130 in the sending device a bandwidth shortage from the sending device to the receiving device. The bandwidth shortage is detected during a second time period different from and subsequent to the first time period. By this is meant that the bandwidth during the second time period is insufficient for sending encoded video frames of the video sequence from the sending device to the receiving device if the encoded video frames are encoded according to an encoding principle used at times without bandwidth shortage.

The method 100 further comprises sending S140 inter encoded frames to the receiving device during the second time period. The inter encoded frames reference the long term reference frame and each inter encoded frame includes encoded blocks. At least a subset of the encoded blocks of the inter encoded frames are set as empty blocks such that the bit rate of the inter encoded frames is lower or equal to the bandwidth during the second time period. An empty block is a block including no update, i.e., coding a zero residual, but may include a motion vector in relation to a block in a reference frame. Hence, an empty block of the inter encoded frames will here be decoded and displayed at the receiving device as a corresponding block of the long term reference frame without any update. An empty block will include fewer bits than a non-empty block. One or more of the subset of the encoded blocks may be skip blocks instead of empty blocks. A skip block is a block includes no update, i.e., coding a zero residual, and no motion vector in relation to a block in a reference frame. Hence, a skip block of the inter encoded frames will here be decoded and displayed at the receiving device as a corresponding block of the long term reference frame without any update. A skip block will include fewer bits than a non-skip block. In the following, each time one or more empty blocks are indicated, some or all of the empty blocks may be skip blocks.

In embodiments, all of the encoded blocks of the inter encoded frames are set to empty blocks. An inter encoded frame including all empty blocks may be referred to as an empty frame or a skip frame. Hence, if an inter encoded frame is an empty frame or skip frame, i.e., includes only empty blocks, the inter encoded frame will here be decoded and displayed at the receiving device as the long term reference frame without any update. Including only empty blocks in the inter encoded frames will result in a bit rate of the inter encoded frames during the second time period that enables sending of the inter encoded frames even at times with available bandwidth much lower than the bandwidth at times without bandwidth shortage.

The inter encoded frames may be sent at the same frame rate as encoded frames sent at times without bandwidth shortage. In alternative, the inter encoded frames may be sent at a lower frame rate. Using a lower frame rate during the second time period will reduce the bit rate of the inter encoded frames during the second timer period. For example, the frame rate of the inter encoded frames may be set to a frame rate required at the receiving device, e.g., required for the receiving device or a function at the receiving device not to time out. The reduced frame rate of the inter encoded frames may further be adapted based on a determined latency of the inter encoded frames. The adapted reduced frame rate may be selected to achieve a rate of received inter encoded frames at the receiving device does not become lower than the required frame rate at the receiving device.

The long term reference frame may contain pixel information unrelated to image pixel data from the scene. For example, the long term reference frame may be a solid colour frame, wherein an operator is informed in advance that when the solid colour is displayed at the receiving device, this means that there is a bandwidth shortage.

The long term reference frame may alternatively or additionally comprise text information or one or more symbols indicating bandwidth shortage. For example, the long term reference frame may comprise text information such as "bandwidth shortage" or one or more symbols indicating bandwidth shortage in a portion of the long term reference frame. A subset of the encoded blocks of each inter encoded frame may then reference corresponding to blocks of the long term reference frame including the text information or the one or more symbols. The remaining encoded blocks of each inter encoded frame may reference a latest frame successfully received in the receiving device. Each inter encoded frame will then be decoded and displayed at the receiving device as the latest successfully received frame with the text information or the one or more symbols indicating bandwidth shortage.

In addition, the inter encoded frames may include inter encoded blocks that encode a predetermined visual change in relation to corresponding blocks of the long term reference frame. To encode the predetermined visual change, the inter encoded blocks are generated to include data defining predetermined changes in relation to the corresponding blocks of the long term reference frame.

For example, the inter encoded blocks referencing the long term reference image may be generated based only on predetermined motion vectors and/or predetermined quantized frequency domain coefficients. The inter encoded blocks encode the predetermined visual change in relation to the long term reference frame, such as predetermined movement, a predetermined change in colour, and/or a predetermined change in brightness in relation to the corresponding blocks of the long term reference frame. Generating the inter encoded blocks based only on predetermined motion vectors and/or predetermined quantized frequency domain coefficients may be performed completely in software up until before entropy encoding and then the entropy encoding may be performed by a software or hardware entropy encoder. Such generation performed completely in software may be referred to as procedural generation. No image data is required for the generating.

Such inter encoded blocks encoding the predetermined visual change may be provided in a subset of the inter encoded frames distributed over the whole second time period. This would introduce a visual change in a subset of the video frames as decoded and displayed at the receiving device distributed over the second time period. In alternative, or in addition, inter encoded blocks encoding different predetermined visual changes may be provided in all of the inter encoded frames of second time period. This is advantageous since an operator at the receiving device may then detect that the receiving device is still receiving the inter encoded frames sent during the second time period when there is a bandwidth shortage since if the inter encoded frames are received, there the visual change will be detected over the second time period when the inter encoded frames are decoded and displayed.

In embodiments where the inter encoded frames include only empty blocks and/or blocks encoding a visual change in relation to the long term reference frame, the inter encoded blocks may be created and stored at the sending device during a third time period different from and preceding the second time period at least up until before entropy encoding and then the entropy encoding may be performed by a software or hardware entropy encoder during the second time period. This is possible for inter encoded frames including blocks that do not require any real time data for encoding, e.g., real time data from video frames captured by a camera. This is advantageous since, when displayed, this will indicate that frames are received at the receiving device.

In addition, the inter encoded frames may include inter encoded blocks that reference a last successfully received frame. For example, a portion of the blocks may be inter encoded blocks referencing a last successfully received frame. This will achieve a frozen image for those blocks.

In addition, some of the encoded blocks of the inter encoded frames may be intra encoded blocks based on current image sensor information. For example, the intra encoded blocks may be a selected small subset of blocks, e.g., selected at a location where there is movement. This is advantageous since, when displayed, this will indicate that frames are received at the receiving device Both a current available bandwidth and whether there is a bandwidth shortage can be determined by measuring a latency of encoded frames sent from the sending device 200 to the receiving device 300, i.e., both the latency of frames encoded according to the encoding principle used at times without bandwidth shortage and of inter encoded frames where a subset of encoded blocks have been set to empty blocks. For example, the latency can be measured by the receiving device 300 and the measurement can then be sent to the sending device 200 which may then determine a bandwidth based on the latency. The latency may be indicated in an acknowledgement message from the receiving device 300 acknowledging the receipt of a frame and a time when the frame was received. The sending device 200 can then determine whether or not there is a bandwidth shortage and, if so how many blocks of the inter encoded frames that need to be set to empty blocks to achieve a bit rate below the available bandwidth. If the latency decreases, the bandwidth has increased. Once the bandwidth is sufficient for sending frames encoded according to the encoding principle used at times without bandwidth shortage, the sending device 200 determines that there is no longer a bandwidth shortage and the sending device 200 may start encoding and sending frames encoded according to the encoding principle used at times without bandwidth shortage. If a latest successfully received encoded frame at the receiving device 300 before the bandwidth shortage is possible to use for reference, the sending device 200 may resume encoding according to the encoding principle used at times without bandwidth shortage with an inter encoded frame referencing the latest successfully received encoded frame. If not, the sending device 200 may resume with an intra encoded frame. Other alternatives are also possible such as using a different device for determining a current available bandwidth and whether there is a bandwidth shortage.

Figure 2:
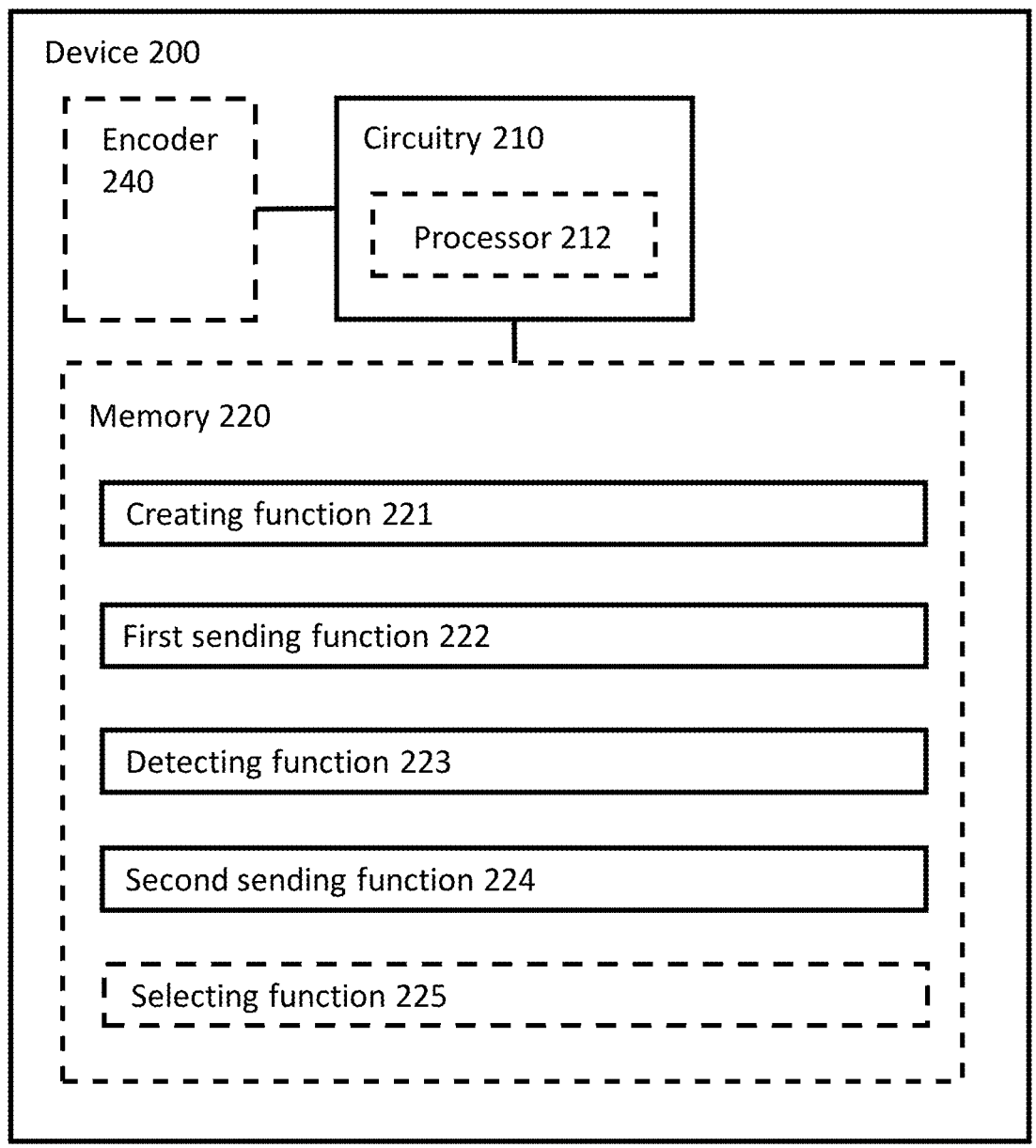
FIG. 2 shows a schematic diagram in relation to embodiments of a sending device for handling a bandwidth shortage in in relation to transmission of video frames of a video sequence to a receiving device

FIG. 2 shows a block diagram in relation to embodiments of a sending device 200 for handling a bandwidth shortage in in relation to transmission of encoded video frames of a video sequence to a receiving device 300. The device 200 may for example be a camera, be included in a camera or be connected to a camera for capturing the video frames of the video sequence.

The sending device 200 comprises circuitry 210. The circuitry 210 is configured to carry out functions of the device 200. The circuitry 210 may include a processor 212, such as for example a central processing unit (CPU), graphical processing unit (GPU), tensor processing unit (TPU), microcontroller, or microprocessor. The processor 212 is configured to execute program code. The program code may for example be configured to carry out the functions of the sending device 200.

The sending device 200 may further comprise a memory 220. The memory 220 may be one or more of a buffer, a flash memory, a hard drive, a removable media, a volatile memory, a non-volatile memory, a random access memory (RAM), or another suitable device. In a typical arrangement, the memory 220 may include a non-volatile memory for long term data storage and a volatile memory that functions as device memory for the circuitry 210. The memory 220 may exchange data with the circuitry 210 over a data bus. Accompanying control lines and an address bus between the memory 220 and the circuitry 210 also may be present.

Functions of the sending device 200 may be embodied in the form of executable logic routines (e.g., lines of code, software programs, etc.) that are stored on a non-transitory computer readable medium (e.g., the memory 220) of the sending device 200 and are executed by the circuitry 210 (e.g., using the processor 212). Furthermore, the functions of the sending device 200 may be a stand-alone software application or form a part of a software application that carries out additional tasks related to the device 200. The described functions may be considered a method that a processing unit, e.g., the processor 212 of the circuitry 210 is configured to carry out. Also, while the described functions may be implemented in software, such functionality may as well be carried out via dedicated hardware or firmware, or some combination of hardware, firmware and/or software.

The circuitry 210 is configured to execute a creating function, 221, a first sending function 222, a detecting function 223, a second sending function 224, and optionally a selecting function 225.

The creating function 221 is configured to create a long term reference frame, wherein the long term reference frame indicates bandwidth shortage.

The first sending function 222 is configured to send, during a first time period, the long term reference frame to the receiving device for storing at the receiving device.

The detecting function 223 is configured to detect, during a second time period different from and subsequent to the first time period, a bandwidth shortage to the receiving device, wherein the bandwidth during the second time period is insufficient for sending video frames of the video sequence to the receiving device if the encoded video frames are encoded according to an encoding principle used at times without bandwidth shortage.

The second sending function 224 is configured to send, to the receiving device during the second time period, inter encoded frames referencing the long term reference frame, wherein each inter encoded frame includes encoded blocks, and wherein at least a subset of the encoded blocks of the inter encoded frames are empty blocks such that the bit rate of the inter encoded frames is lower or equal to the bandwidth during the second time period.

The circuitry 210 may further be configured to execute a selecting function 225 configured to select the first time period such that the bandwidth from the sending device to the receiving device during the first time period is sufficient for sending the long term reference frame.

The circuitry 210 may further be configured to execute an encoding function for encoding video frames either according to an encoding principle used at times without bandwidth shortage or as inter encoded frames referencing the long term reference frame, wherein each inter encoded frame includes encoded blocks, and wherein at least a subset of the encoded blocks of the inter encoded frames are empty blocks such that the bit rate of the inter encoded frames is lower or equal to the bandwidth during the second time period. The encoding is performed in an encoder 240 which may be arranged in or connected to the sending device 200.

The circuitry 210 may further be configured to execute an encoding function for encoding video frames either according to an encoding principle used at times without bandwidth shortage or as inter encoded frames referencing the long term reference frame, wherein each inter encoded frame includes encoded blocks, and wherein at least a subset of the encoded blocks of the inter encoded frames are empty blocks such that the bit rate of the inter encoded frames is lower or equal to the bandwidth during the second time period. The encoding is performed in an encoder 240 which may be arranged in or connected to the sending device 200.

The detailed description of the acts of the method 100 described in relation to FIG. 1 hereinabove apply also for the corresponding functions of the sending device 200. Furthermore, the optional additional features of the method 100 described in relation to FIG. 1 hereinabove, when applicable, apply also to the sending device 200.

Figure 3:
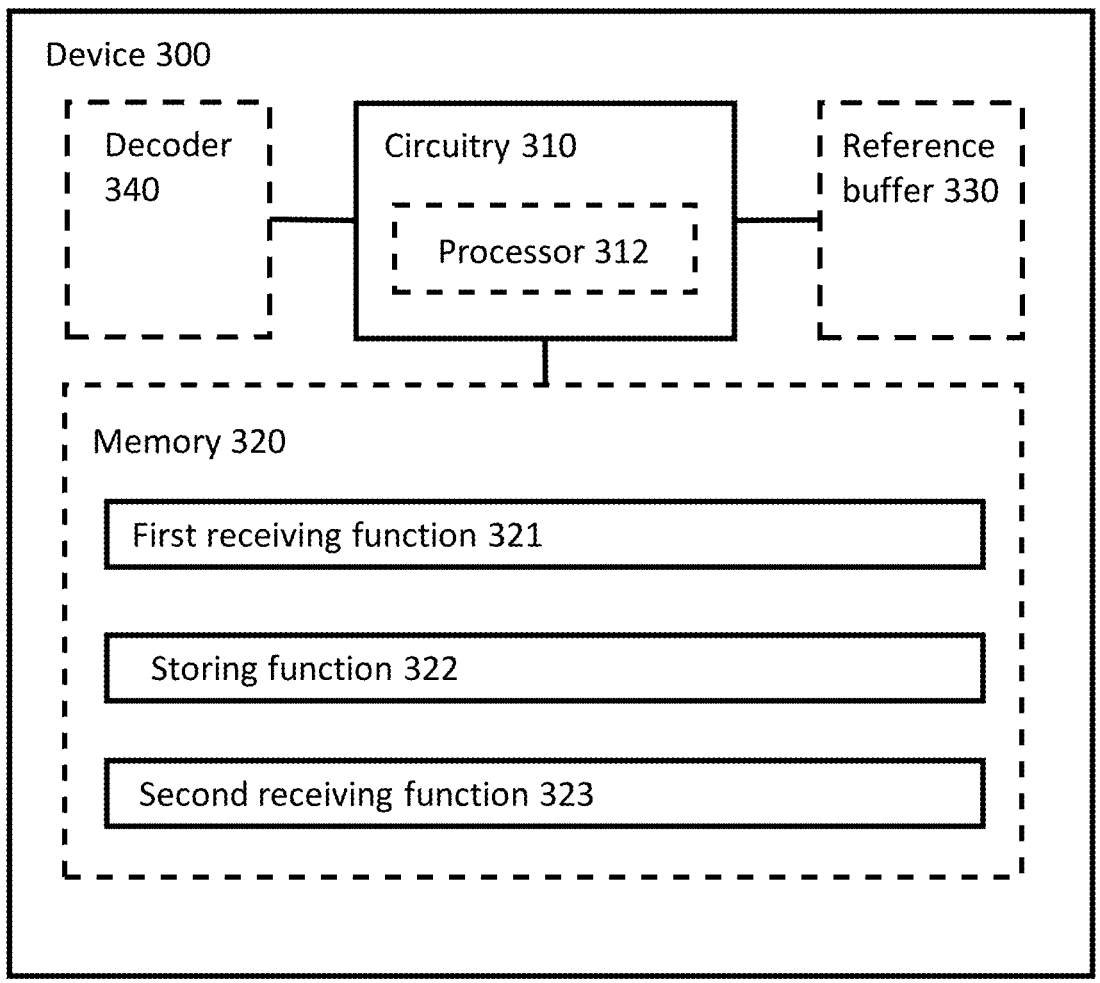
FIG. 3 shows a schematic diagram in relation to embodiments of a receiving device for handling a bandwidth shortage in in relation to transmission of video frames of a video sequence from a sending device.

FIG. 3 shows a block diagram in relation to embodiments of a receiving device 300 for handling a bandwidth shortage in in relation to transmission of video frames of a video sequence from a sending device 200. The receiving device may for example be a device running video management software or mobile application connected to a body worn camera.

The receiving device 300 comprises circuitry 310. The circuitry 310 is configured to carry out functions of the receiving device 300. The circuitry 310 may include a processor 312, such as for example a central processing unit (CPU), graphical processing unit (GPU), tensor processing unit (TPU), microcontroller, or microprocessor. The processor 312 is configured to execute program code. The program code may for example be configured to carry out the functions of the receiving device 300.

The receiving device 300 may further comprise a memory 320. The memory 320 may be one or more of a buffer, a flash memory, a hard drive, a removable media, a volatile memory, a non-volatile memory, a random access memory (RAM), or another suitable device. In a typical arrangement, the memory 320 may include a non-volatile memory for long term data storage and a volatile memory that functions as device memory for the circuitry 310. The memory 320 may exchange data with the circuitry 310 over a data bus. Accompanying control lines and an address bus between the memory 320 and the circuitry 310 also may be present.

Functions of the receiving device 300 may be embodied in the form of executable logic routines (e.g., lines of code, software programs, etc.) that are stored on a non-transitory computer readable medium (e.g., the memory 320) of the receiving device 300 and are executed by the circuitry 310 (e.g., using the processor 312). Furthermore, the functions of the receiving device 300 may be a stand-alone software application or form a part of a software application that carries out additional tasks related to the receiving device 300. The described functions may be considered a method that a processing unit, e.g., the processor 312 of the circuitry 310 is configured to carry out. Also, while the described functions may be implemented in software, such functionality may as well be carried out via dedicated hardware or firmware, or some combination of hardware, firmware and/or software.

The circuitry 310 is configured to execute a first receiving function 321, a storing function 322, and a second receiving function 323.

The first receiving function 321 is configured to receive, during a first time period, a long term reference frame from a sending device, wherein the long term reference frame indicates bandwidth shortage.

The storing function 322 is configured to store the long term reference frame. For example, the long term reference frame may be stored in a reference buffer 330 of the receiving device 300.

The second receiving function 323 is configured to receive inter encoded frames from the sending device 200 during a second time period different from and subsequent to the first time period. The inter encoded frames reference the long term reference frame and each inter encoded frame includes encoded blocks. At least a subset of the encoded blocks of the inter encoded frames are empty blocks such that the bit rate of the inter encoded frames is lower or equal to the bandwidth during the second time period.

The circuitry 310 may further be configured to execute a decoding function for decoding video frames which have been encoded either according to an encoding principle used at times without bandwidth shortage or as inter encoded frames referencing the long term reference frame, wherein each inter encoded frame includes encoded blocks, and wherein at least a subset of the encoded blocks of the inter encoded frames are empty blocks such that the bit rate of the inter encoded frames is lower or equal to the bandwidth during the second time period. The decoding is performed in a decoder 340 which may be arranged in or connected to the receiving device 300.

The detailed description of the acts of the method 100 described in relation to FIG. 1 hereinabove apply also for the corresponding functions of the receiving device 300. Furthermore, the optional additional features of the method 100 described in relation to FIG. 1 hereinabove, when applicable, apply also to the receiving device 300.

Figure 4:
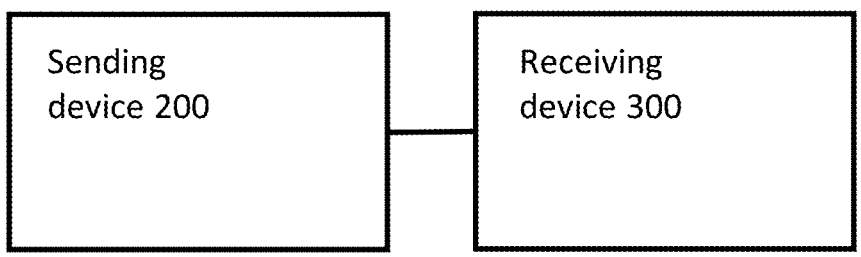
FIG. 4 shows a schematic diagram in relation to embodiments of a system for handling a bandwidth shortage in in relation to transmission of video frames of a video sequence from a sending device to a receiving device.

FIG. 4 shows a block diagram in relation to embodiments of a system 400 for handling a bandwidth shortage in in relation to transmission of video frames of a video sequence.

The system 400 comprises a sending device 200 as described in relation to FIG. 2, and a receiving device 300 as described in relation to FIG. 3.

The detailed description of the acts of the method 100 described in relation to FIG. 1 hereinabove apply also for the corresponding functions of the system 400. Furthermore, the optional additional features of the method 100 described in relation to FIG. 1 hereinabove, when applicable, apply also to the system 400.

The invention claimed is:

1. A method for handling a bandwidth shortage in relation to transmission of encoded video frames of a video sequence captured by a camera from a sending device to a receiving device, the method comprising:
   creating, in the sending device, a long term reference frame, wherein the long term reference frame contains pixel information unrelated to image pixel data captured by the camera to indicate a bandwidth shortage;
   sending, during a first time period, the long term reference frame from the sending device to the receiving device for storing at the receiving device;
   detecting, in the sending device during a second time period different from and subsequent to the first time period, a bandwidth shortage from the sending device to the receiving device, wherein the bandwidth during the second time period is insufficient for sending encoded video frames of the video sequence from the sending device to the receiving device if the encoded video frames are encoded according to an encoding principle used at times without bandwidth shortage; and
   sending, to the receiving device during the second time period, inter encoded frames referencing the long term reference frame, wherein each inter encoded frame includes encoded blocks, and wherein at least a subset of the encoded blocks of the inter encoded frames are set as empty blocks such that the bit rate of the inter encoded frames is lower or equal to the bandwidth during the second time period, such that an operator, when viewing a decoded and displayed inter encoded frame of the inter encoded frames referencing the long term reference frame, is enabled to derive that there is a bandwidth shortage and wherein the operator is informed in advance that the pixel information unrelated to image pixel data captured by the camera indicates a bandwidth shortage.

2. The method of claim 1, wherein all of the encoded blocks of the inter encoded frames are empty blocks.

3. The method according to claim 1, further comprising:
   selecting the first time period such that the bandwidth from the sending device to the receiving device during the first time period is sufficient for sending the long term reference frame.

4. The method according to claim 1, wherein the long term reference frame is a solid colour frame.

5. The method according to claim 1, wherein the long term reference frame comprises one or more of text information, a symbol, and an image indicating bandwidth shortage.

6. The method according to claim 1, wherein the inter encoded frames are created and stored at the sending device during a third time period different from and preceding the second time period.

7. The method according to claim 1, further comprising:
   storing the long term reference frame in a reference buffer at the receiving device.

8. The method according to claim 7, wherein the long term reference frame is indicated to be maintained in the reference buffer.

9. A device for handling a bandwidth shortage in in relation to transmission of video frames of a video sequence captured by a camera to a receiving device, the device comprising:
   circuitry configured to execute:
   a creating function configured to create a long term reference frame, wherein the long term reference frame contains pixel information unrelated to image pixel data captured by the camera to indicate a bandwidth shortage;
   a first sending function configured to send, during a first time period, the long term reference frame to the receiving device for storing at the receiving device;
   a detecting function configured to detect, during a second time period different from and subsequent to the first time period, a bandwidth shortage to the receiving device, wherein the bandwidth during the second time period is insufficient for sending video frames of the video sequence to the receiving device if the encoded video frames are encoded according to an encoding principle used at times without bandwidth shortage; and
   a second sending function configured to send, to the receiving device during the second time period, inter encoded frames referencing the long term reference frame, wherein each inter encoded frame includes encoded blocks, and wherein at least a subset of the encoded blocks of the inter encoded frames are empty blocks such that the bit rate of the inter encoded frames is lower or equal to the bandwidth during the second time period, such that an operator, when viewing a decoded and displayed inter encoded frame of the inter encoded frames referencing the long term reference frame, is enabled to derive that there is a bandwidth shortage and wherein the operator is informed in advance that the pixel information unrelated to image pixel data captured by the camera indicates a bandwidth shortage.

10. The device according to claim 9, wherein all of the encoded blocks of the inter encoded frames are empty blocks.

11. The device according to claim 10, wherein the long term reference frame is a solid colour frame.

12. A device for handling a bandwidth shortage in relation to transmission of video frames of a video sequence captured by a camera from a sending device, the device comprising:
  circuitry configured to execute:
  a first receiving function configured to receive, during a first time period, a long term reference frame from a sending device, wherein the long term reference frame contains pixel information unrelated to image pixel data captured by the camera to indicate a bandwidth shortage;
  a storing function configured to store the long term reference frame; and
  a second receiving function configured to receive, from the sending device during a second time period different from and subsequent to the first time period, inter encoded frames referencing the long term reference frame, wherein each inter encoded frame includes encoded blocks, and wherein at least a subset of the encoded blocks of the inter encoded frames are empty blocks such that the bit rate of the inter encoded frames is lower or equal to the bandwidth during the second time period, such that an operator, when viewing a decoded and displayed inter encoded frame of the inter encoded frames referencing the long term reference frame, is enabled to derive that there is a bandwidth shortage and the operator is informed in advance that the pixel information unrelated to image pixel data captured by the camera indicates a bandwidth shortage.

\* \* \* \* \*